(12) United States Patent
Zaykov et al.

(10) Patent No.: US 10,366,007 B2
(45) Date of Patent: Jul. 30, 2019

(54) APPARATUSES AND METHODS FOR DETERMINING EFFICIENT MEMORY PARTITIONING

(71) Applicant: Honeywell International Inc., Morris Plains, NJ (US)

(72) Inventors: Pavel Zaykov, Brno (CZ); Lucie Matusova, Novy Jicin (CZ)

(73) Assignee: Honeywell International Inc., Morris Plains, NJ (US)

( * ) Notice: Subject to any disclaimer, the term of this patent is extended or adjusted under 35 U.S.C. 154(b) by 15 days.

(21) Appl. No.: 15/837,793

(22) Filed: Dec. 11, 2017

(65) Prior Publication Data

US 2019/0179756 A1 Jun. 13, 2019

(51) Int. Cl.
*G06F 12/08* (2016.01)
*G06F 12/0846* (2016.01)
*G06F 12/0811* (2016.01)

(52) U.S. Cl.
CPC ...... *G06F 12/0848* (2013.01); *G06F 12/0811* (2013.01); *G06F 12/0851* (2013.01); *G06F 2212/282* (2013.01); *G06F 2212/283* (2013.01)

(58) Field of Classification Search
CPC ............ G06F 12/0848; G06F 12/0811; G06F 12/0851; G06F 2212/282; G06F 2212/283; G06F 2212/2542
See application file for complete search history.

(56) References Cited

U.S. PATENT DOCUMENTS 6,751,739 B1  6/2004 Verdun
7,783,852 B2 * 8/2010 Lahiri ................... G06F 12/023
                                              707/812

(Continued)

FOREIGN PATENT DOCUMENTS

CN  103678155 A  3/2014
CN  105068940 A  11/2015
FR    3010201 A1  3/2015

OTHER PUBLICATIONS

Kim et al., "Bounding Memory Interference Delay in Cots-Based Multi-Core Systems", Proceedings of the IEEE Real-Time and Embedded Technology and Applications Symposium (RTAS), 2014, pp. 145-154.
Liu et al., "A Software Memory Partition Approach for Eliminating Bank-Level Interference in Multicore Systems", PACT '12 Proceedings of the 21st International Conference on Parallel Architectures and Compilation Techniques, Sep. 19-23, 2012,pp. 367-376.
Nowotsch et al., "Leveraging Multi-Core Computing Architectures in Avionics", 2012 Ninth European Dependable Computing Conference, Publisher: IEEE Computer Society, pp. 132-143.

(Continued)

*Primary Examiner* — Reginald G Bragdon
*Assistant Examiner* — Hannah A Faye
(74) *Attorney, Agent, or Firm* — Fogg & Law LLC

(57) ABSTRACT

A method comprises: receiving input data comprising a number of read and write uncached transactions, a transaction density, a number of active cores (N active cores) of the at least two cores, main memory address layout, and number of and an identifier for each of: banks and ranks in main memory, interconnects, cache pools, and memory controllers; defining all sets of active cores; defining up to N sets of memory pools; performing, for combinations of at least one set of active cores with each of at least one subset, the specified number of read and write uncached transactions with main memory at a specified transaction density for each defined combination of each active core combination and each defined memory pools; measuring the execution time of such performance for each combination; storing the execution time for each combination; and identifying at least one combination having a lower execution time.

20 Claims, 4 Drawing Sheets

(56) References Cited

U.S. PATENT DOCUMENTS

| | | | |
|---|---|---|---|
| 8,069,308 | B2 | 11/2011 | Larson et al. |
| 8,943,287 | B1* | 1/2015 | Miller .................. G06F 5/06 |
| | | | 711/163 |
| 9,256,380 | B1 | 2/2016 | Daniel et al. |
| 9,612,868 | B2 | 4/2017 | Easwaran et al. |
| 2002/0069318 | A1 | 6/2002 | Chow et al. |
| 2009/0177849 | A1 | 7/2009 | Mazzola et al. |
| 2009/0216939 | A1 | 8/2009 | Smith et al. |
| 2011/0131377 | A1* | 6/2011 | Gray .................. G06F 12/084 |
| | | | 711/122 |
| 2011/0258420 | A1 | 10/2011 | Devadas et al. |
| 2015/0039833 | A1 | 2/2015 | Chang et al. |
| 2015/0089164 | A1 | 3/2015 | Ware et al. |
| 2015/0205724 | A1 | 7/2015 | Hancock et al. |
| 2016/0239213 | A1 | 8/2016 | Liu et al. |
| 2017/0336973 | A1 | 11/2017 | Chakraborty et al. |
| 2018/0188976 | A1 | 7/2018 | Koo et al. |
| 2018/0239709 | A1 | 8/2018 | Zaykov et al. |

OTHER PUBLICATIONS

Reineke et al., "Pret Dram Controller: Bank Privatization for Predictability and Temporal Isolation", 2011 Proceedings of the 9th International Conference on Hardware/Software Codesign and System Synthesis (Codes+ISSS), Oct. 9-14, 2011, pp. 99-108.

Suzuki et al., "Coordinated Bank and Cache Coloring for Temporal Protection of Memory Accesses", 16th International Conference on Computational Science and Engineering (CSE), 2013 IEEE, Dec. 3-5, 2013, pp. 1-8, Publisher IEEE.

Zaykov Pavel et al., "Memory Partitioning for a Computing System With Memory Pools", U.S. Appl. No. 15/440,242, filed Feb. 23, 2017, To Be Published in: US, pp. 1-30.

DDC-I, Inc. "Deos, a Time & Space Partitioned, Multi-core Enabled, DO-178C DAL A Certifiable RTOS"; "found at https://www.ddci.com/products_deos_do_178c_arinc_653/ "; Accesses on Aug. 15, 2018; pp. 1-3; Published: Phoenix, AZ.

European Patent Office; "Extended European search report from EP Application No. 18157513.5 dated Jul. 5, 2018"; from Foreign Counterpart of U.S. Appl. No. 15/440,242; pp. 1-10; dated: Jul. 5, 2018; Published: EP.

FAA "Certification Authorities Software Team (CAST)" "Position Paper CAST-32A' Multi-core Processors"; Nov. 2016; pp. 1-23.

FAA; "Certification Authorities Software Team (CAST) Position Paper CAST-2"; "Guidelines for Assessing Software Partitioning/Protection Schemes"; Feb. 2001; pp. 1-7.

Jean Xavier, et. al; "The Use of MULticore proCessORS in Airborne Systems"; Research Project EASA.2011/6; Publisher: Thales Avionics; European Aviation Safety Agency; Dec. 16, 2012; pp. 1-163.

King Time; "Managing Cache Partitioning Multicore Processors for Certifiable, Safety-Critical Avionics Software Applications"; DDC-I Safety Critical Software Solutions for Mission Critical Systems; Presented at 33rd DASC; Oct. 5-9, 2014; pp. 1-21.

Liu Lei, et. al; "BPM/BPM+: Software-Based Dynamic Memory Partitioning Mechanisms for Mitigating DRAM Bank-/Channel-Level Interferences in Multicore Systems" ACM Transactions on Architecture and Code Optimization, Association for Computing Machinery; Published: US; vol. 11, No. 1; pp. 1-28; Dated Feb. 1, 2014.

NXP Semiconductors; "Product Longevity"; Found at www.nxp.com/webapp/ecommerce.show_cart/framework; Dated Jul. 26, 2018; pp. 1-3; NXP Semiconductors Reports Second Quarter 2018 Results.

Parkinson Paul; "The challenges of developing embedded real-time aerospace applications on next generation multi-core processors"; Publisher: Wind River; pp. 1-6; 2016.

U.S. Patent and Trademark Office, "Final Office Action from U.S. Appl. No. 15/440,242 dated Jan. 11, 2019", pp. 1-28, Published in US.

U.S. Patent and Trademark Office, "Non-Final Office Action from U.S. Appl. No. 15/440,242 dated Sep. 7, 2018", pp. 1-34. Published in: US.

U.S. Patent and Trademark Office, "Advisory Action", U.S. Appl. No. 15/440,242, Apr. 11, 2019, pp. 16, Published: US.

U.S. Patent and Trademark Office, "Office Action", U.S. Appl. No. 15/440,242, Apr. 30, 2019, pp. 136, Published: US.

\* cited by examiner

APPARATUSES AND METHODS FOR DETERMINING EFFICIENT MEMORY PARTITIONING

BACKGROUND

Avionics systems are being implemented by running one or more applications (application(s)) on multi-core processor systems having an operating system, such as a Real-Time Operating System (RTOS). Some applications need to execute quickly for mission critical uses such as in aerospace systems, e.g. avionics.

The operating system may assign unique core(s) of a multi-core processor and one or more unique memory pool(s) of a multi-core processor system to each process of an application running on the multi-core processor systems. Each memory pool comprises one or more of each of the following: interconnects, cache memory pools, memory controllers, ranks of main memory, and banks of rank(s) of the main memory. Memory pools are further described in pending U.S. patent application Ser. No. 15/440,242 filed on Feb. 23, 2017 and entitled "Memory Partitioning for A Computing System with Memory Pools", which is incorporated by reference herein in its entirety. Proper selection of memory pools and corresponding cores facilitates reduced memory access times, thereby yielding a substantial increase in speed at which an application is executed on the multi-core processor.

Not all combinations of core(s) and memory pool(s), however, provide enhanced application execution speed. Non-optimal combinations may slow application execution time which results in disadvantageous avionics system performance. Accordingly, there is a need to identify combinations of core(s) and memory pool(s) in multi-core processor computing systems to improve application execution speed on the system.

SUMMARY

A method for determining efficient memory partitioning is provided. The method comprises:
 receiving input data comprising a number of read and write uncached transactions with main memory, a transaction density, a number of active cores (N active cores) of the at least two of at least one of a physical core and a virtual core, main memory address layout, and number of and an identifier for each of: banks and ranks in main memory, interconnects, cache pools, and memory controllers;
 defining all sets of active cores where each set of active cores has a different combination of active cores and comprises N active cores;
 defining up to N sets of memory pools where each set corresponds to a unique active cores where each of the N sets has at least one subset, where each subset of a set has M memory pools, where the memory pools of each subset are unique combinations of all memory pool components, and where each memory pool comprises at least one of each memory pool component: interconnect, cache pool, memory controller, rank, and bank of the rank;
 performing, for combinations of at least one set of active cores and each of at least one subset of a corresponding set of memory pools, the specified number of read and write uncached transactions with main memory at the specified transaction density for each combination of each active core combination and each memory pool subset;
 measuring execution time of the performance for each combination;
 storing the execution time for each combination; and
 identifying at least one combination having an execution time lower than the execution times of other combinations.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for determining configurations of core(s) of a multi-core processor, cache memory pool(s), memory controllers, interconnect(s), ranks of main memory, and banks of rank(s) of the main memory of a multi-core processor system that provide speedy, and possibly the quickest, execution time for an application on a multi-core processor system.

Figure 1:
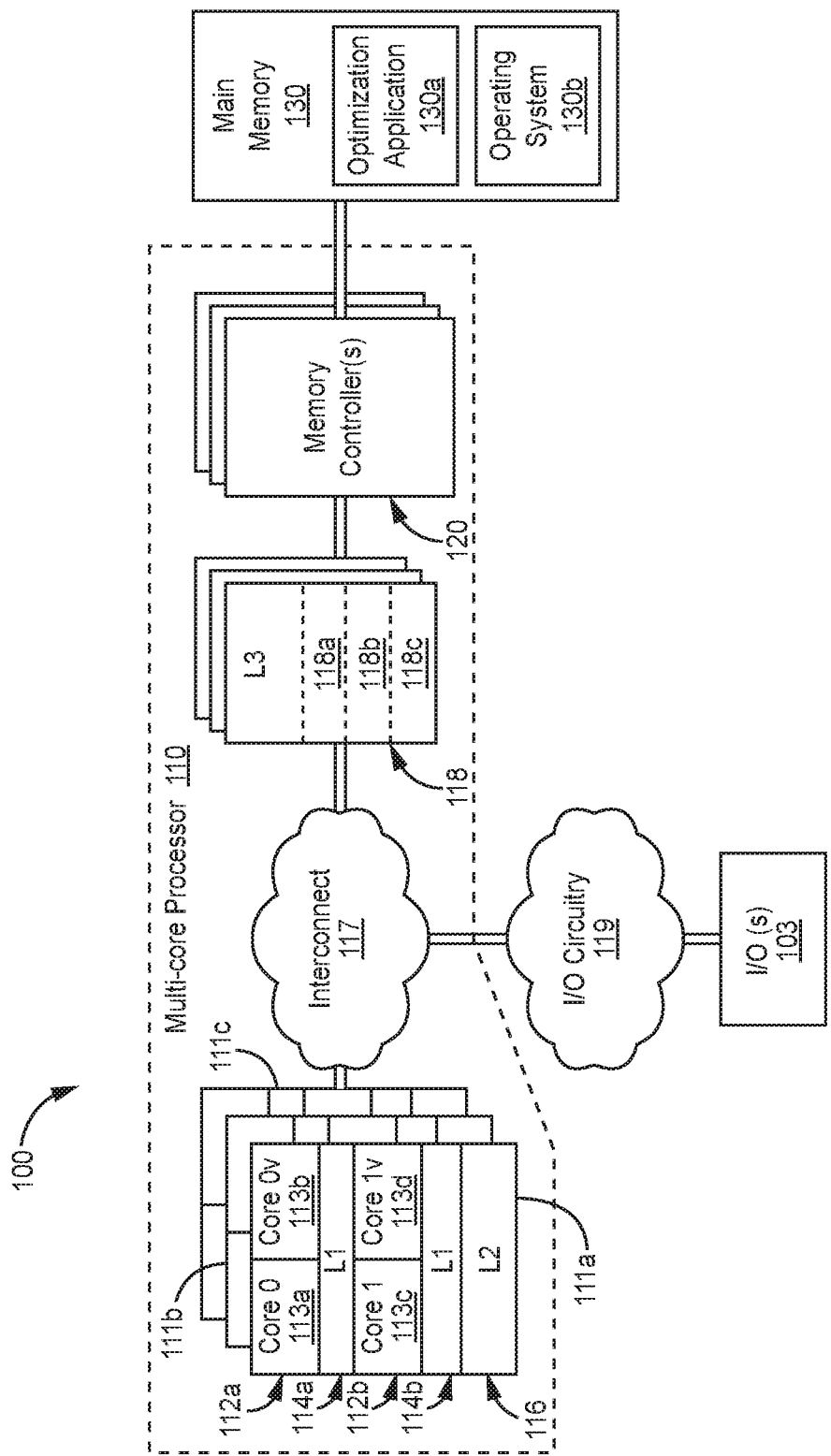
FIG. 1 illustrates a block diagram of one embodiment of a multi-core processor system including an optimization application.

FIG. 1 illustrates a block diagram of one embodiment of a multi-core processor system including an optimization application (multi-core processor system) 100. The multi-core processor system 100 includes a multi-core processor 110 coupled to main memory 130. The main memory 130 is the physical memory where applications and associated data are stored and accessed at run-time. The main memory 130 may be implemented, for example, by dynamic random access memory (DRAM).

In one embodiment, an optimization application 130a, which will be subsequently described, resides in the main memory 130. Alternatively, the optimization application 130a may be stored in a system coupled to the multi-core processor system 100. In one embodiment, the optimization application 130a may be implemented with program code. When executed with a multi-core processor 110, an application, such as the optimization application 130a, comprises multiple threads which can be executed in parallel by different cores of the multi-core processor 110. In another embodiment, the optimization application 130a may be stored in other non-transitory computer readable media, such as those subsequently illustrated.

Regardless of the location of the optimization application 130a, an operating system 130b resides in the main memory 130; the operating system 130b is executed by the multi-core processor system 100, and permits applications such as the optimization application 130 to be executed by the multi-core processor system 100. The operating system 130 serves as an interface between an application and the hardware of the multi-core processor system 100, maps applications to cores, and implements memory pools including user specified configurations.

The multi-core processor 110 comprises at least two of at least one of a physical core and a virtual core coupled to a memory hierarchy system. The memory hierarchy system includes one or more caches 114*a*, 114*b*, 116, 118, one or more memory controller(s) 120, and an interconnect 117.

In the illustrated embodiment, each core has a physical core 113*a*, 113*c*, and a respective virtual core 113*b*, 113*d*. The cores execute instructions of applications performed on the multi-core processor system 100. Virtual cores 113*b*, 113*d* are executed on their physical core counterparts 113*a*, 113*c*, e.g. using simultaneous multithreading such as Hyper-Threading. However, not all multi-core processors utilize virtual cores.

Cores 112*a*, 112*b* and caches, e.g. Level 1 (L1) caches 114*a*, 114*b* and Level 2 (L2) cache 116, may be grouped into processor clusters 111*a*, 111*b*, 111*c*. A unique core cluster may be assigned to one application so that the processor threads of each application are guaranteed a predetermined portion of processor execution time. The processor clusters 111*a*, 111*b*, 111*c*, e.g. at least two of at least one of a physical core and at least one virtual core, and at least one cache, are coupled by the interconnect 117 to higher level cache memory, e.g. Level 3 (L3) cache 116, memory controller(s) 120, and main memory 130. The interconnect 117 also couples processor clusters 111*a*, 111*b*, 111*c*, L3 cache 118, the memory controller(s) 120, and main memory 130 to input/output (I/O) circuitry 119.

The caches 114*a*, 114*b*, 116, 118 are memory in which the cores 112*a*, 112*b* can more quickly access data then from main memory 130, and thus expedite execution of an application. The caches store data and/or instructions used by the cores. For example, the caches 114*a*, 114*b*, 116, and 118 store frequently used data stored in the main memory 130. Caches 114*a*, 114*b*, 116, and 118 may be implemented with static or dynamic random access memory. There may be different levels of cache, e.g. Levels 1 (L1), 2 (L2), 3 (L3), etc. Typically, the higher order the cache, the more memory it has.

In one embodiment, the core 112*a*, 112*b*, L1 cache 114*a*, 114*b*, L2 cache 116, and interconnect 117 are co-fabricated on a semiconductor die. In an alternative embodiment, the L3 cache 118 and/or the memory controller(s) 120 are also co-fabricated on the semiconductor die.

In the illustrated embodiment, each L1 cache 114*a*, 114*b* is proximate to a unique physical core 113*a*, 113*c*. The proximate physical core utilizes the corresponding L1 cache. the corresponding virtual cores 113*b*, 113*d* utilize L1 caches 114*a*, 114*b* proximate to the physical core 113*a*, 113*c* upon which the virtual core is executed.

The shared Level 2 (L2) cache 112 is proximate to the physical cores 113*a*, 113*c*. The physical cores 113*a*, 113*c* (and the virtual cores 113*b*, 113*d* if used) utilize the L2 cache 116.

The interconnect 117 couples the physical cores 113*a*, 113*c* (and correspondingly virtual cores 113*b*, 113*d* if used) and lower level cache, L1 and/or L2 cache, to higher level cache memory, e.g. Level 3 (L3) cache 116, memory controller(s) 120, and main memory 130. The interconnect 117 also couples the cores 113*a*, 113*b*, 113*c*, 113*d*, the caches 114*a*, 114*b*, 116, 118, the memory controller(s) 120, and main memory 130 to input/output (I/O) circuitry 119. The I/O circuitry 119 facilitates transmitting and receiving data to external input and output devices such as keyboards, cursor control devices (e.g. a mouse), display(s), and printer(s). The interconnect 117, may be implemented as a ring, a fabric or mesh, or a bus.

The physical cores 113*a*, 113*c* (and the virtual cores 113*b*, 113*d* if used) utilize the L3 cache 118. The L3 cache 118 is also known as platform cache and buffers main memory accesses by the cores. In one embodiment, L3 cache 118 can be segregated into two or more separate portions 118*a*, 118*b*, 118*c*. In another embodiment, other caches, such as L1 cache 114*a*, 114*b* and L2 cache 116 can also be segregated into two or more portions. The L3 cache 118 is coupled to memory controller(s) 120.

The memory controller(s) 120 contain logic to read and write to portions of main memory 130. Using the memory controller(s) 120 which orders accesses to the main memory 130, portions of main memory 130 may be copied to one or more of the caches 114*a*, 114*b*, 116, 118. The memory controller(s) 120 may utilize interleaving, e.g. for main memory 130 that is DRAM, to more efficiently read and write to main memory 130. For example, a memory controller 120 may read or write data respectively from or to a word of memory from each memory bank in successive order of the banks. Memory controller interleaving is dependent upon interleaving granularity and interleaving pattern. The interleaving granularity is a number of bits read or written at any time. Bits read or written in a granule reside in the corresponding memory controller. The interleaving pattern is defined by the number of the number of memory controllers to be interleaved, and the interleaving granularity. The interleaving pattern is the order in which data is accessed, e.g. from ranks or banks. In one embodiment, the memory controller(s) 120 also refresh main memory 130 when it is dynamic memory such as DRAM.

Figure 2:
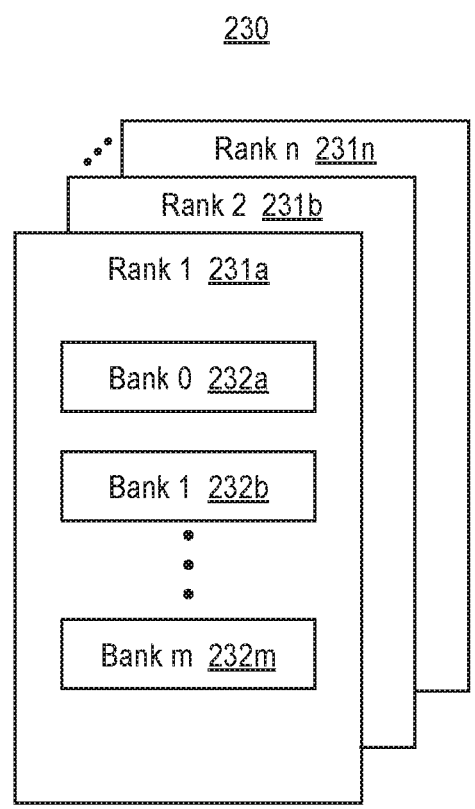
FIG. 2 illustrates a block diagram of one embodiment of the main memory in which the optimization application resides.

FIG. 2 illustrates a block diagram of one embodiment of the main memory 230 in which the optimization application 130*a* resides. The main memory comprises one or more ranks (rank(s)) 231*a*, 231*b*, 231*n* of memory. In a further embodiment, one or two ranks of memory are physically implemented in a Single In-line Memory Module (SIMM) or a Dual In-line Memory Module (DIMM). Each rank includes one or more banks 232*a*, 232*b*, 232*m* of memory.

In a DRAM, each memory cell (a single bit) is implemented by a small capacitor. As time passes, the charge in the capacitor weakens, so without being explicitly refreshed the stored data would eventually be lost. To prevent data losses, extra hardware periodically reads and writes back to each memory cell (i.e., performs a refresh), restoring the capacitor charge to its original level. The DRAM refreshes are automatically conducted and are transparent to the user.

Memory architecture offers three levels of parallelism, including memory controllers, and main memory ranks and banks. The number of ranks defines the number of banks. Memory partitioning for the multi-core processor system 100 can be implemented with memory pools as referenced above. Such memory pools are formed by partitioning one or more of: one or more of the different levels of cache(s) (i.e. into cache pools), the memory controller(s) 120, and the main memory 130; as used herein, "memory partitioning" means partitioning the aforementioned components. In memory partitioning, groups of unique portions cache(s), and memory controller(s) 120 are grouped together.

Depending on application needs, different levels of memory access isolation can be achieved. For example, without partitioning main memory 130, memory accesses can be non-isolated. The memory pools share main memory using interleaving implemented by the memory controller(s) 120.

In alternative embodiments, main memory 130 may be partitioned by rank or bank. Memory access isolation can be further progressively increased by partitioning banks or even ranks of main memory 130. Each such partition is assigned to a memory pool. Increased memory access isolation results in a reduced number of available memory pools.

In some implementations, at least some of the threads are assigned to the same memory pool, or at least some of the threads can be respectively assigned to different memory pools. In addition, at least some of the threads can be mapped onto, i.e. assigned and executed by, the same core, or at least some of the threads can be respectively mapped onto different cores. Further, at least some of the memory pools can be respectively mapped, in a one to one (1:1) correspondence, to the memory controllers, the one or more ranks, or the one or more banks. Alternatively, at least some of the memory pools can be respectively mapped, in a one to many (1:N) correspondence, to multiples of the memory controllers, the one or more ranks, and the one or more banks. Each such memory pool is assigned to an application (or an application process) and/or a core cluster 111a, 111b, 111c. The memory pools are also implemented based upon address bits to select memory banks; number of active memory ranks, rank bits, and interleaving pattern; number of active memory controllers, interleaving granularity, and interleaving pattern; and optionally, cache index address bits.

Bank partitioning uses the bank address bits to define a size and pattern of the memory pools in the main memory. The memory pools are mapped to the main memory with respect to bank address bits and rank address bits. In this technique, the DRAM bank partitions can be used to avoid delays caused by sharing the banks between cores that results in row buffer evictions, and provide an expected performance increase of up to about 30%.

Rank partitioning uses the rank address bits to access ranks, such that higher number of ranks results in a higher number of available banks.

An exemplary memory address layout for a DRAM device is shown in Table 1.

TABLE 1

| Rows | Rank | Bank | Col 1 | Channel | Col 2 | Byte |
|---|---|---|---|---|---|---|
| 31-18 | 17 | 16-14 | 13-7 | 6 | 5-3 | 2-0 |

As the address layout of Table 1 suggests, there are dedicated address bits for the memory banks.

If the processor documentation is limited and information concerning the address layout is missing, then discovery algorithms can be applied to determine the address layout, such as the algorithm proposed by Liu et al., *A software memory partition approach for eliminating bank-level interference in multicore systems*, In Proc. of the Int'l Conf. on Parallel Architectures and Compilation Techniques (PACT), 2012, pp. 367-376, which is incorporated by reference herein in its entirety.

When a cache partitioning technique is employed, cache memory is divided into cache pools which are mapped to the main memory, e.g. with respect to cache index address bits. Further details related to cache partitioning techniques, such as cache memory pools, are described in U.S. Pat. No. 8,069,308, entitled Cache Pooling for Computing Systems, and in U.S. Publication No. 2015/0205724, entitled System and Method of Cache Partitioning for Processors with Limited Cached Memory Pools, both of which are incorporated herein by reference in their entirety.

Depending on the memory address layout, either 1:1 (one to one) or 1:N (one to many) mappings of the memory pools can be made among the cache, memory controller, ranks, and banks.

Figure 3:
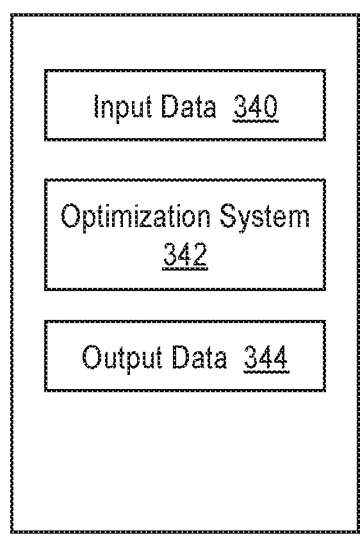
FIG. 3 illustrates one embodiment of the optimization application.

FIG. 3 illustrates one embodiment of the optimization application 330a. The optimization application 330a may be stored in main memory 130 and/or cache memory.

Alternatively, the optimization application 330a may be stored in memory external to the multi-core processor system 100. Thus, the optimization application 330a may be executed on a computer system external to but coupled to the multi-core processor system 100. If the optimization application 330a is executed on such an external computer system, that external computer system commands the multi-core processor system 100 to perform the reading and writing to main memory as described elsewhere herein.

The illustrated optimization application 330a includes input data 340, an optimization system 342, and output data 344. In one embodiment, input data includes the number of active cores (physical, or physical and virtual if available) in the multi-core processor system 100, DRAM address layout, data identifying the number of: banks and ranks in main memory 130, interconnects 117, cache pools, and memory controllers 120. Optionally, the input data includes interleaving data. The interleaving data identifies the type of interleaving patterns to be used (none, rank, or bank), and an interleaving granularity and pattern of interleaving available (if applicable). In another embodiment, the input data 340 and/or the output data 344 comprise one or more databases, data files and/or data registers.

The number of active cores is the number of cores the will be used to execute the optimization application 330a, i.e. the thread(s) of the optimization application 330a. There may be more threads than available cores. The number of active cores is less than or equal to the number of cores in the multi-core processor 110. In one embodiment, the number of active cores is defined by a user of the optimization application 330a or an application profile.

Optionally, in another embodiment, the input data 340 includes a default number of transactions and a default transaction density. The number of transactions means a number of reads and writes respectively from and to main memory 130. Transaction density means a rate of reading and writing per unit time, e.g. with respect to clock cycles, respectively from and to main memory 130. In one embodiment, the default number of transactions and transaction density are worst case performance values for main memory 130; such worst case performance values may be the maximum ratings for the main memory 130, e.g. DRAM.

Optionally, in another embodiment, the input data 340 includes one or more application signature data, e.g. provided by a user of the optimization application 330a. Each application signature data includes data, e.g. representative of an application, for which speedy execution is desired on the multi-core processor system 100. Each signature data may include number of transactions, transaction density, and/or active cores which can be different than the defaults for the foregoing parameters. The application signature data supplants the default number of transactions and transaction density, if those defaults are used.

If DRAM address layout may be provided by the user of the optimization application 330a; if not, then it can be extracted by optimization application 330a, e.g. using a technique like that described above.

The number of cores, banks and ranks in main memory 130, interconnects 117, cache pools, and memory controllers 120 may also be provided by the user of the optimization application 330a; if some are not, then they may be extracted by the operating system 130a and/or the optimization application 330a.

When the optimization application 330a is executed by the multi-core processor system 100, at least one thread will be executed on each active core. When executed, the application determines execution time when performing a specific number of uncached transactions (i.e. a specific number of uncached reads and writes to main memory 130) at a specific transaction density for different combinations of active cores and different combinations of memory pools. Such uncached transactions will be performed according to interleaving data, if any. The number of transactions, the transaction density, and/or the number of active cores are specified by default values or specified by an application signature.

An example of different possible combinations of active cores will be provided. The combinations of active cores require that the specified number of active cores be used. When three active cores are specified for a four core multi-core processor 110, there are four possible combinations of three active cores: [(Core 1, Core 2, and Core 3), (Core 1, Core 2, and Core 4), (Core 1, Core 3, and Core 4), (Core 2, Core 3, and Core 4)]. In one embodiment, the different combinations of active cores are stored in the output data 344. The active cores of a combination may be in different processor clusters, i.e. one, two, or more processor clusters.

An example of different possible combinations of memory pools will be provided. The different combinations of memory pools fall within different sets of memory pools. The number of sets equals the number of active cores. The first set includes all combinations of single memory pools. The second set includes all combinations of two memory pools, and so on. Thus, each set comprises at least one memory pool. Each memory pool comprises a combination of memory pool components, and at least one of each memory pool component. For example, a memory pool may have one through the total number available of each of an interconnect, a cache pool, a memory controller, a rank, and a bank of the rank. In one embodiment, the different combinations of memory pools are stored in the output data 344.

The maximum number of sets of distinct memory pools is defined by the number of active cores. Thus, for three active cores, there are three sets of memory pools: all combinations possible for one memory pool, all combinations possible for two memory pools, and all possible combinations for three memory pools. An example of different possible combinations of memory pools will be provided. However, for each set, each combination must include at least one of each of an interconnect, a cache pool, a memory controller, a rank, and a bank of the rank. This ensures that each memory pool includes its requisite constituent elements. In one embodiment, the maximum number of sets of distinct memory pools is stored in the output data 344.

The optimization application 130a performs the specified number of uncached transactions at a specified transaction density for each combination of each active core combination and each combination of memory pools. The optimization application 130a measures and stores the execution time for each combination of each active core combination and memory pool combination. In one embodiment, the measured execution times are stored in the output data 344.

When one or more memory pool components (i.e. interconnect(s), cache pool(s), memory controller(s), and a rank(s)/bank(s)) is shared by more than one memory pool, and thus more than one core, then there is no memory isolation. An extreme example occurs when a single memory pool is shared by more than one core, e.g. all active cores. The lack of memory isolation can have a deleterious effect on execution time. Alternatively, if each memory pool is comprised of unique components, there is complete memory isolation. However, this requires that there be at least as many number of each component as active cores. When there is complete memory isolation, execution time is generally improved.

Figure 4:
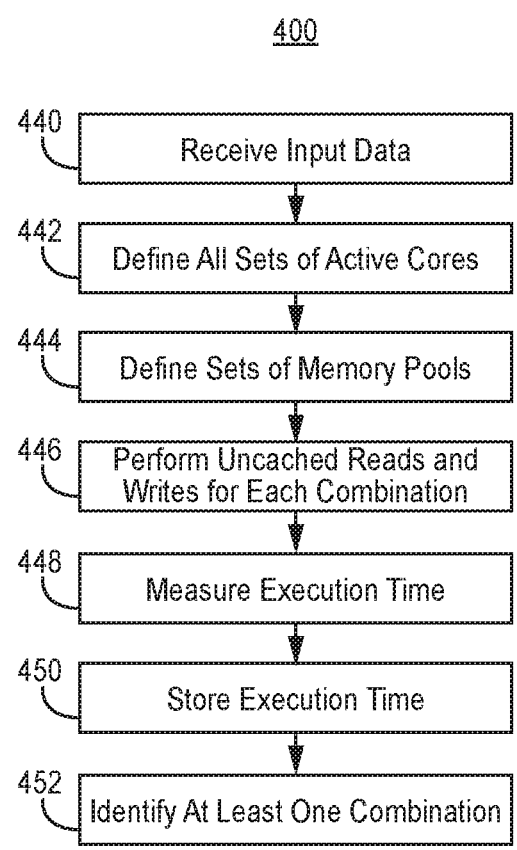
FIG. 4 is a flow diagram of a method for determining efficient memory partitioning.

FIG. 4 is a flow diagram of a method 400 for determining efficient memory partitioning. To the extent the method 400 shown in FIG. 4 is described herein as being implemented in the system shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, receive input data. The input data comprises the number of active cores (physical, virtual, or physical and virtual) in the multi-core processor system 100 (N active cores, where N≥2), the main memory address layout, the data identifying the number of and an identifier for each of: banks and ranks in main memory 130, interconnects 117, cache pools, and memory controllers 120. Identifiers indicate specific components or portions of specific components. The identifier for banks and ranks is a memory address. The identifiers for interconnects, cache pools, and memory controllers are implementation specific, and would be known to one skilled in the art. Optionally, in one embodiment, the input data includes interleaving data such as the type of interleaving patterns to be used (none, rank, or bank), and a granularity and pattern of interleaving (if applicable). The input data 340 includes a default number of transactions and a default transaction density and/or an actual number of transactions and transaction densit(ies) for one or more application profiles In block 442, define all sets of active cores, where each set has a different combination of active cores and comprises N active cores. In block 444, define up to N sets of memory pools, where each of the N sets has at least one subset, where each subset of a set has M memory pools, where the memory pools of each subset are unique combinations of all memory pool components, and where each memory pool comprises at least one of each memory pool component: an interconnect, a cache pool, a memory controller, a rank, and a bank of the rank. M as used herein is a term defined by the user of the multi core processing system, and is limited by the characteristics of the multi core processor and the components that form memory pools. Prior to performing the method, a user also defines components in each of the M sets. For example, prior to running the optimization application 130a, the user defines, in the operating system 130b, the components in each of the M sets.

In block 446, for combinations of at least one set of active cores and each of at least one subset of a corresponding set of memory pools, perform the specified number of uncached reads and writes, e.g. to main memory, at the specified transaction density for each combination of each active core combination and each memory pool subset. In one embodiment, perform the specified number of uncached reads and writes at the specified transaction density for combinations of all sets of active cores with each of all subsets of corresponding memory pools. In another embodiment, uncached reads and writes are performed according to an application signature, or the type of interleaving pattern, the interleaving pattern, and the interleaving granularity.

In block 448, measure the execution time of such performance for each combination. In block 450, store, e.g. in main memory, the execution time for each combination.

In block 452, identify at least one the combination of set of active cores and subset having execution times lower than execution times of other combinations. In one embodiment, identify a combination having an execution time lower than execution times of other combinations. In another embodiment, identify the at least one combination comprises printing and/or displaying the at least one combination, e.g. with the I/O(s). In a further embodiment, such at least one combination of the set of active cores and subset having lower execution times is stored in the output data 344.

A computer or processor used in the present system and method can be implemented using software, firmware, hardware, or any appropriate combination thereof, as known to one of skill in the art. By way of example and not limitation, hardware components can include one or more microprocessors, memory elements, Digital Signal Processing (DSP) elements, interface cards, and other standard components known in the art. These may be supplemented by, or incorporated in, specially-designed Application Specific Integrated Circuits (ASICs) or Field Programmable Gate Arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable media may include storage or memory media such as magnetic or optical media. For example, storage or memory media may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory). Combinations of the above are also included within the scope of computer readable media.

Example Embodiments

Example 1 includes a computer, comprising: a multi-core processor, comprising: at least two of at least one of a physical core and a virtual core; at least one first level cache coupled to the at least two of at least one of a physical core and a virtual core; at least one interconnect coupled to the at least two of at least one of a physical core and a virtual core and the at least one first level cache; at least one second level cache coupled to the interconnect; and at least one memory controller coupled to the interconnect; and at least one main memory, coupled to the at least one memory controller, comprising: an operating system; an optimization application; and wherein the optimization application is configured to: receive input data comprising a number of read and write uncached transactions with main memory, a transaction density, a number of active cores (N active cores) of the at least two of at least one of a physical core and a virtual core, main memory address layout, and number of and an identifier for each of: banks and ranks in main memory, interconnects, cache pools, and memory controllers; define all sets of active cores where each set of active cores has a different combination of active cores and comprises N active cores; define up to N sets of memory pools, where each of the N sets has at least one subset, where each subset of a set of M memory pools, where the memory pools of each subset are unique combinations of all memory pool components, and where each memory pool comprises at least one of each memory pool component: interconnect, cache pool, memory controller, rank, and bank of the rank; perform, for combinations of at least one set of active cores and each of at least one subset of a corresponding set of memory pools, the specified number of read and write uncached transactions with main memory at the specified transaction density for each combination of each active core combination and each memory pool subset; measure execution time of the performance for each combination; store the execution time for each combination; and identify at least one combination having an execution time lower than the execution times of other combinations.

Example 2 includes the computing system of Example 1, further comprising: I/O circuitry coupled to the at least one interconnect; at least one I/O coupled to the I/O circuitry; and wherein the optimization application is further configured to perform at least one of printing and displaying, on the at least one I/O, of the identified at least one combination.

Example 3 includes the computing system of any of Examples 1-2, wherein receive input data further comprises receive a type of interleaving pattern, an interleaving granularity, and a pattern of interleaving; and wherein perform the specified number of read and write uncached transactions comprises perform the specified number of read and write uncached transactions using the type of interleaving pattern, the interleaving granularity, and the pattern of interleaving.

Example 4 includes the computing system of any of Examples 1-3, wherein the received input data further comprises an application profile comprising a number of read and write uncached transactions with main memory and a transaction density.

Example 5 includes the computing system of any of Examples 1-4, the received number of read and write uncached transactions and transaction density comprise a default number of read and write uncached transactions and a default transaction density.

Example 6 includes the computing system of any of Examples 1-5, wherein the default number of read and write uncached transactions and the default case transaction density comprise a worst case number of read and write uncached transactions and a worst case transaction density.

Example 7 includes a method for determining efficient memory partitioning, comprising: receiving input data comprising a number of read and write uncached transactions with main memory, a transaction density, a number of active cores (N active cores) of at least two of at least one of a physical core and a virtual core, main memory address layout, and number of and an identifier for each of: banks and ranks in main memory, interconnects, cache pools, and memory controllers; defining all sets of active cores where each set of active cores has a different combination of active cores and comprises N active cores; defining up to N sets of memory pools, where each of the N sets has at least one subset, where each subset of a set has M memory pools, where the memory pools of each subset are unique combinations of all memory pool components, and where each memory pool comprises at least one of each memory pool component: interconnect, cache pool, memory controller, rank, and bank of the rank; performing, for combinations of at least one set of active cores and each of at least one subset of a corresponding set of memory pools, the specified number of read and write uncached transactions with main memory at a specified transaction density for each combination of each active core combination and each memory pool subset; measuring execution time of the performance for each combination; storing the execution time for each combination; and identifying at least one combination having an execution time lower than the execution times of other combinations.

Example 8 includes the method of Example 7, further comprising performing at least one of printing or displaying the identified at least one combination.

Example 9 includes the method of any of Examples 7-8, wherein receiving the input data further comprises receiving input data comprising type of interleaving pattern, interleaving granularity, and pattern of interleaving; and wherein performing the specified number of read and write uncached transactions comprises performing the specified number of read and write uncached transactions using the type of interleaving pattern, the interleaving granularity, and the pattern of interleaving.

Example 10 includes the method of any of Examples 7-9, wherein receiving the input data further comprises receiving input data comprising an application profile comprising a number of read and write uncached transactions with main memory and a transaction density.

Example 11 includes the method of any of Examples 7-10, wherein receiving input data comprising a number of read and write uncached transactions with main memory and a transaction density comprises receiving input data comprising a default number of read and write uncached transactions and a default number of worst case transaction density.

Example 12 includes the method of Example 11, wherein receiving input data comprising the default number of read and write uncached transactions and a default number of transaction density comprises receiving input data comprising a worst case number of read and write uncached transactions and a worst case transaction density.

Example 13 includes the method of any of Examples 7-12, wherein identifying the at least one of set of active cores and the subset having execution times lower than the execution times of the other combinations comprises at least one of displaying and printing the at least one of set of active cores and the subset having execution times lower than the execution times of the other combinations.

Example 14 includes a non-transitory computer readable medium storing a program causing a computer to execute a process to determine efficient memory partitioning, the process comprising: receiving input data comprising a number of read and write uncached transactions with main memory, a transaction density, a number of active cores (N active cores) of at least two of at least one of a physical core and a virtual core, main memory address layout, and number of and an identifier for each of: banks and ranks in main memory, interconnects, cache pools, and memory controllers; defining all sets of active cores where each set of active cores has a different combination of active cores and comprises N active cores; defining up to N sets of memory pools, where each of the N sets has at least one subset, where each subset of a set has M memory pools, where the memory pools of each subset are unique combinations of all memory pool components, and where each memory pool comprises at least one of each memory pool component: interconnect, cache pool, memory controller, rank, and bank of the rank; performing, for combinations of at least one set of active cores and each of at least one subset of a corresponding set of memory pools, the specified number of read and write uncached transactions with main memory at the specified transaction density for each combination of each active core combination and each memory pool subset; measuring execution time of such performance for each combination; storing the execution time for each combination; and identifying at least one combination having an execution time lower than execution times of other combinations.

Example 15 includes the non-transitory computer readable medium of Example 14, further comprising performing at least one of printing or displaying the identified at least one combination.

Example 16 includes the non-transitory computer readable medium of any of Examples 14-15, wherein receiving the input data further comprises receiving input data comprising type of interleaving pattern, interleaving granularity, and pattern of interleaving; and wherein performing the specified number of read and write uncached transactions comprises performing the specified number of read and write uncached transactions using the type of interleaving pattern, the interleaving granularity, and the pattern of interleaving.

Example 17 includes the non-transitory computer readable medium of any of Examples 14-16, wherein receiving the input data further comprises receiving input data comprising an application profile comprising a number of read and write uncached transactions with main memory and a transaction density.

Example 18 includes the non-transitory computer readable medium of any of Examples 14-17, wherein receiving input data comprising a number of read and write uncached transactions with main memory and a transaction density comprises receiving input data comprising a default number of read and write uncached transactions and a default case transaction density.

Example 19 includes the non-transitory computer readable medium of Example 18, wherein receiving input data comprising the default number of read and write uncached transactions and a default number of transaction density comprises receiving input data comprising a worst case number of read and write uncached transactions and a worst case transaction density.

Example 20 includes the non-transitory computer readable medium of Example 14, wherein identifying the at least one of set of active cores and the subset having execution times lower than the execution times of the other combinations comprises at least one of displaying and printing the at least one of set of active cores and the subset having execution times lower than the execution times of the other combinations.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A computer, comprising:
a multi-core processor, comprising:
  at least two of at least one of a physical core and a virtual core;
  at least one first level cache coupled to the at least two of at least one of a physical core and a virtual core;
  at least one interconnect coupled to the at least two of at least one of a physical core and a virtual core and the at least one first level cache;
  at least one second level cache coupled to the interconnect; and
  at least one memory controller coupled to the interconnect; and
at least one main memory, coupled to the at least one memory controller, comprising:
an operating system;
an optimization application; and
wherein the optimization application is configured to:
  receive input data comprising a number of read and write uncached transactions with main memory, a transaction density, a number of active cores (N active cores) of the at least two of at least one of a physical core and a virtual core, main memory address layout, and number of and an identifier for each of: banks and ranks in main memory, interconnects, cache pools, and memory controllers;
  define all sets of active cores where each set of active cores has a different combination of active cores and comprises the N active cores;
  define up to N sets of memory pools, where each of the N sets has at least one subset, where each subset of a set of M memory pools, where the memory pools of each subset are unique combinations of all memory pool components, and where each memory pool comprises at least one of each memory pool component: interconnect, cache pool, memory controller, rank, and bank of the rank;
  perform, for combinations of at least one set of active cores and each of at least one subset of a corresponding set of memory pools, the specified number of read and write uncached transactions with main memory at the specified transaction density for each combination of each active core combination and each memory pool subset;
  measure execution time of the performance for each combination;
  store the execution time for each combination; and
  identify at least one combination having an execution time lower than the execution times of other combinations.

2. The computing system of claim 1, further comprising:
I/O circuitry coupled to the at least one interconnect;
at least one I/O coupled to the I/O circuitry; and
wherein the optimization application is further configured to perform at least one of printing and displaying, on the at least one I/O, of the identified at least one combination.

3. The computing system of claim 1, wherein receive input data further comprises receive a type of interleaving pattern, an interleaving granularity, and a pattern of interleaving; and
wherein perform the specified number of read and write uncached transactions comprises perform the specified number of read and write uncached transactions using the type of interleaving pattern, the interleaving granularity, and the pattern of interleaving.

4. The computing system of claim 1, wherein the received input data further comprises an application profile comprising a number of read and write uncached transactions with main memory and a transaction density.

5. The computing system of claim 1, the received number of read and write uncached transactions and transaction density comprise a default number of read and write uncached transactions and a default transaction density.

6. The computing system of claim 1, wherein the default number of read and write uncached transactions and the default case transaction density comprise a worst case number of read and write uncached transactions and a worst case transaction density.

7. A method for determining efficient memory partitioning, comprising:
receiving input data comprising a number of read and write uncached transactions with main memory, a transaction density, a number of active cores (N active cores) of at least two of at least one of a physical core and a virtual core, main memory address layout, and number of and an identifier for each of: banks and ranks in main memory, interconnects, cache pools, and memory controllers;
defining all sets of active cores where each set of active cores has a different combination of active cores and comprises the N active cores;
defining up to N sets of memory pools, where each of the N sets has at least one subset, where each subset of a set has M memory pools, where the memory pools of each subset are unique combinations of all memory pool components, and where each memory pool comprises at least one of each memory pool component: interconnect, cache pool, memory controller, rank, and bank of the rank;
performing, for combinations of at least one set of active cores and each of at least one subset of a corresponding set of memory pools, the specified number of read and write uncached transactions with main memory at a specified transaction density for each combination of each active core combination and each memory pool subset;
measuring execution time of the performance for each combination;
storing the execution time for each combination; and
identifying at least one combination having an execution time lower than the execution times of other combinations.

8. The method of claim 7, further comprising performing at least one of printing or displaying the identified at least one combination.

9. The method of claim 7, wherein receiving the input data further comprises receiving input data comprising type of interleaving pattern, interleaving granularity, and pattern of interleaving; and wherein performing the specified number of read and write uncached transactions comprises performing the specified number of read and write uncached transactions using the type of interleaving pattern, the interleaving granularity, and the pattern of interleaving.

10. The method of claim 7, wherein receiving the input data further comprises receiving input data comprising an application profile comprising a number of read and write uncached transactions with main memory and a transaction density.

11. The method of claim 7, wherein receiving input data comprising a number of read and write uncached transactions with main memory and a transaction density comprises receiving input data comprising a default number of read and write uncached transactions and a default number of worst case transaction density.

12. The method of claim 11, wherein receiving input data comprising the default number of read and write uncached transactions and a default number of transaction density comprises receiving input data comprising a worst case number of read and write uncached transactions and a worst case transaction density.

13. The method of claim 7, wherein identifying the at least one of set of active cores and the subset having execution times lower than the execution times of the other combinations comprises at least one of displaying and printing the at least one of set of active cores and the subset having execution times lower than the execution times of the other combinations.

14. A non-transitory computer readable medium storing a program causing a computer to execute a process to determine efficient memory partitioning, the process comprising:

receiving input data comprising a number of read and write uncached transactions with main memory, a transaction density, a number of active cores (N active cores) of at least two of at least one of a physical core and a virtual core, main memory address layout, and number of and an identifier for each of: banks and ranks in main memory, interconnects, cache pools, and memory controllers;

defining all sets of active cores where each set of active cores has a different combination of active cores and comprises the N active cores;

defining up to N sets of memory pools, where each of the N sets has at least one subset, where each subset of a set has M memory pools, where the memory pools of each subset are unique combinations of all memory pool components, and where each memory pool comprises at least one of each memory pool component: interconnect, cache pool, memory controller, rank, and bank of the rank;

performing, for combinations of at least one set of active cores and each of at least one subset of a corresponding set of memory pools, the specified number of read and write uncached transactions with main memory at the specified transaction density for each combination of each active core combination and each memory pool subset;

measuring execution time of such performance for each combination;

storing the execution time for each combination; and identifying at least one combination having an execution time lower than execution times of other combinations.

15. The non-transitory computer readable medium of claim 14, further comprising performing at least one of printing or displaying the identified at least one combination.

16. The non-transitory computer readable medium of claim 14, wherein receiving the input data further comprises receiving input data comprising type of interleaving pattern, interleaving granularity, and pattern of interleaving; and wherein performing the specified number of read and write uncached transactions comprises performing the specified number of read and write uncached transactions using the type of interleaving pattern, the interleaving granularity, and the pattern of interleaving.

17. The non-transitory computer readable medium of claim 14, wherein receiving the input data further comprises receiving input data comprising an application profile comprising a number of read and write uncached transactions with main memory and a transaction density.

18. The non-transitory computer readable medium of claim 14, wherein receiving input data comprising a number of read and write uncached transactions with main memory and a transaction density comprises receiving input data comprising a default number of read and write uncached transactions and a default case transaction density.

19. The non-transitory computer readable medium of claim 18, wherein receiving input data comprising the default number of read and write uncached transactions and a default number of transaction density comprises receiving input data comprising a worst case number of read and write uncached transactions and a worst case transaction density.

20. The non-transitory computer readable medium of claim 14, wherein identifying the at least one of set of active cores and the subset having execution times lower than the execution times of the other combinations comprises at least one of displaying and printing the at least one of set of active cores and the subset having execution times lower than the execution times of the other combinations.

* * * * *